UNITED STATES PATENT OFFICE.

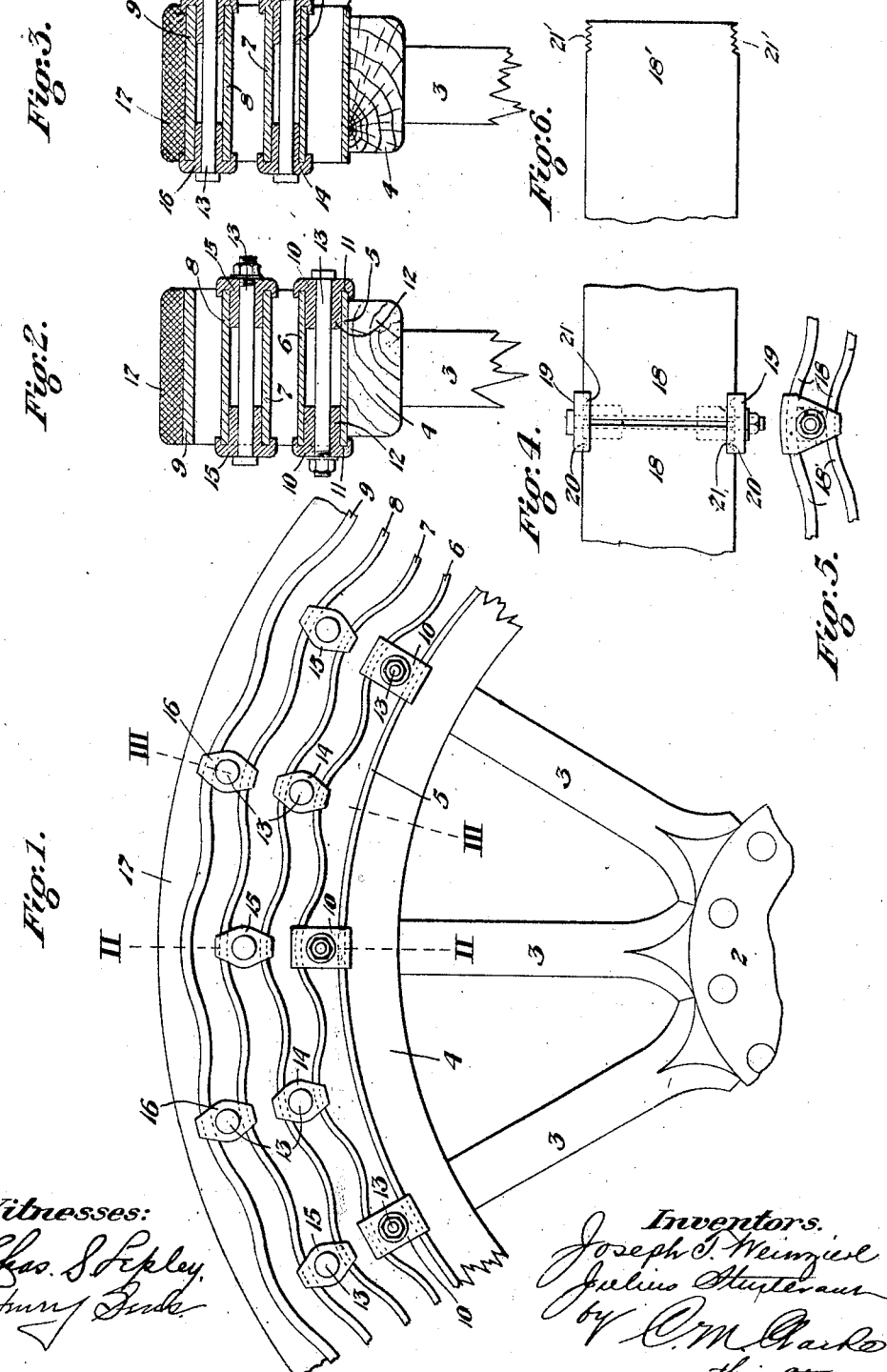

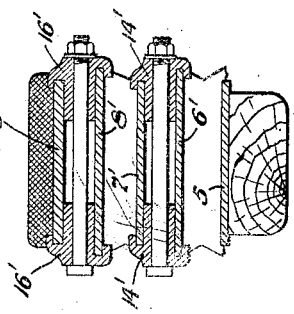
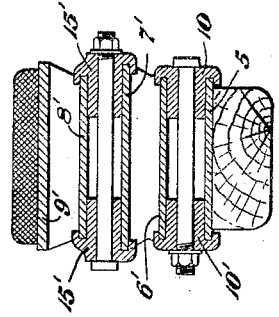
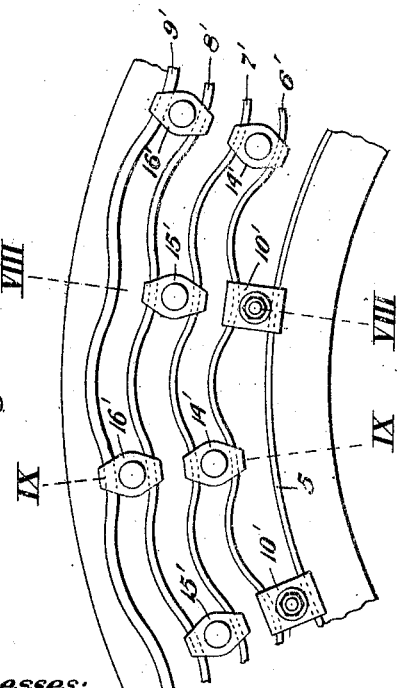
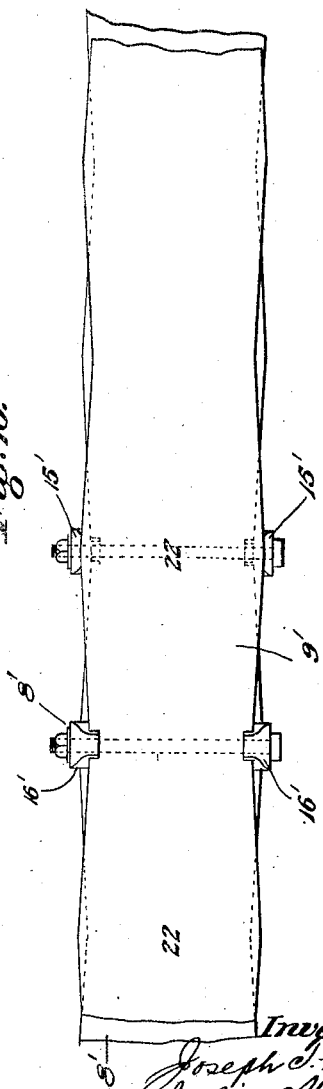

JOSEPH T. WEINZIERL AND JULIUS STURTEVANT, OF NEW KENSINGTON, PENNSYLVANIA.

SPRING-WHEEL.

1,058,395.  Specification of Letters Patent.  Patented Apr. 8, 1913.

Application filed January 11, 1911. Serial No. 602,036.

*To all whom it may concern:*

Be it known that we, JOSEPH T. WEINZIERL and JULIUS STURTEVANT, citizens of the United States and of the Empire of Germany, respectively, residing at New Kensington, in the county of Westmoreland and State of Pennsylvania, have invented certain new and useful Improvements in Spring-Wheels, of which the following is a specification.

Our invention consists of an improvement in vehicle wheels and has for its object to provide a wheel having the desired resiliency as to its tire with the accompanying qualities of continuous serviceability, avoidance of the necessity of inflation or accident from puncture, etc., common to pneumatic tires, together with the advantages of cheapness, simplicity, ease of removal and substitution of any of the parts, etc., constructed and operable in the manner more fully hereinafter set forth.

Generally stated, the improvement consists in providing a wheel of any suitable form with a surrounding rim portion composed of a concentric annular series of undulated or corrugated flat spring members, spaced apart and connected together at suitable intervals and to the rim of the wheel, whereby to distribute and absorb the strains incident to use, with an outer shoe or tread of any suitable material.

In the drawings: Figure 1 represents in elevation a portion of a wheel constructed in accordance with our invention. Figs. 2 and 3 are cross sectional detail views on the lines II. II. and III. III. respectively of Fig. 1. Fig. 4 is a detail plan view showing the manner of connecting the ends of one of the annular spring members and the modified form of clip therefor. Fig. 5 is a view in elevation of said connecting clip, showing the attachment thereby of one spring member with the next adjacent member. Fig. 6 is a detail view showing the end of the spring provided with a plurality of grooves or notches. Fig. 7 is a view similar to Fig. 1, showing a modified arrangement of the connecting clamps with relation to the undulations of the spring members. Figs. 8 and 9 are cross sectional detail views on the lines VIII. VIII. and IX. IX. respectively, of Fig. 7. Fig. 10 is a detail plan view showing the modification shown in Fig. 7 in top plan view.

The body portion of the wheel proper may be of any suitable type or construction, of any suitable material, comprising the usual hub 2, spokes 3 or their equivalent, and felly 4. In the construction shown, the wheel is provided with a surrounding rim 5 which may be a continuous annular band of steel or other suitable material, the edges of which extend slightly beyond the felly 4, at each side as clearly shown. Outwardly beyond said rim 5 are a series of annularly arranged convoluted spring members 6, 7, 8 and 9, of any desired number, according to the weight to be carried or other conditions. As shown, each of said annular spring members is continuously convoluted or corrugated, whereby to provide a continuous annular series of wave-like sections, and each member is spaced apart from its adjacent member and from the rim 5, sufficiently far to permit of ample flexure between the points of attachment of the adjacent members.

In the construction shown in Fig. 1, the annular spring member 6, adjacent to the rim 5, is connected with the rim by a series of clamps 10; 10, one at each side of the rim and spring member, having transverse grooves 11 adapted to embrace the edges of the connected members and preferably extending inwardly therebetween by a central extension 12, as shown. The clamps are rigidly connected by bolts 13 provided with terminal heads and nuts. It will be observed that the spring member 6 is connected by said clamps at those portions which are farthest from the rim 5, *i. e.* at points of outward bend or convolution. At intermediate points between clamps 10, the annular member 6 is similarly connected with its adjacent annular member 7 by similar clamps 14, similarly connecting the outwardly bowed portions of the annular spring members. Likewise, that at corresponding positions and in corresponding relation, the annular members 7 and 8 are similarly connected by similar clamps 15; annular spring member 8 being in the same manner connected with the outermost spring member 9, by similar clamps 16. While four such annular spring member are shown in the drawings, it will be understood that the number may be more or less, subject to the conditions, whereby to provide the series of annular spring members, rigidly connected together at somewhat closely adjacent points, the spaced members thus comprising in their entirety, a surrounding elastic structure.

17 is a shoe or tread, of any suitable material as rubber, fiber, etc., having a bearing exterior and its interior corresponding to and fitting against the undulated surface of the outer annular spring member 9 and secured thereto by any suitable means. As shown, the thickness of the spring members is preferably gradually increased outwardly whereby to provide increasing stiffness, although such is not essential and may or may not be adopted, as desired.

In operation, as thus constructed, and assuming the weight to be supported upon the wheel and in contact with the ground at any particular point, as for instance that defined by the section line III. III., the strain will be distributed from the shoe and outer member 9 through clamp 16, thence in each direction laterally through adjacent member 8 to clamps 15, 15; thence in each direction through adjacent member 7 to clamps 14, 14, 14; and thence through adjacent annular member 6 to clamps 10, 10, 10, 10, to the rim 5. The strain will likewise be partly absorbed by all of the clamps through their connection with the spring members adjacent to the clamp 16, at each side thereof, and the several neighboring clamps, gradually throughout the several component parts of the wheel tire, in a lessening degree. During the travel of the wheel over the ground, and under a superimposed load, the distribution of the weight, together with the traction of the wheel, when driven, as in an automobile, will be similarly distributed annularly around the wheel. The frequent attachments by the clamps; the ample spaces intervening between the annular members and the clamps, annularly, together with the inherent stiffness and accompanying resiliency of the component members of the wheel, will operate to entirely absorb the several strains without impairment of any single element. While the same general arrangement and disposition of the parts may be also accomplished in a series of circumferential spring members of other form we prefer the corrugated arrangement, as it provides for greater flexibility and endurance with a higher degree of accompanying resiliency. While the spring members may, if desired, be continuous throughout, ease and convenience of construction is more readily accomplished by making them of bands bent to form and joined at their ends, in the manner shown in Figs. 4 and 5. In such construction, the ends 18, 18, of the annular spring members are brought into abutting contact, or slightly spaced apart, and are connected by the clamping devices 19, similar to clamps 10, 14, 15 and 16, but having inwardly projecting lugs 20 engaging corresponding recesses 21 in the edges of the spring members.

In Fig. 6 we show the end of the spring member 18' as provided with a plurality of such recesses or serrations 21', whereby to permit of adjustment as to length, due to contingencies of shrinkage, expansion, etc. The connecting clamps 19 have their lugs 20 correspondingly notched for engagement of the serrations 21'. If desired, each clamp throughout the circumference of the wheel may also have a similar interfitting notched engagement with the edges of the annular spring members to prevent displacement and insure maintenance of the spaced positions of the several clamps.

In Fig. 7 we show the series of spring members 6', 7', 8', and 9' connected together in the same manner shown, but at their points of inward bend, by means of similar clamps 10', 14', 15' and 16'. The construction otherwise is substantially as above described, except that inner spring member 6' is spaced somewhat farther away from rim 5', whereby to admit of the insertion of clamps 10', with ample intervening space for compression. The construction and operation otherwise is as above described.

While ordinarily, the points of connection annularly of the spring members are sufficiently close together to obviate the necessity of any additional reinforcement, we may, if desired, reinforce or stiffen the annular members between the points of attachment, as by widening them as indicated at 22, Fig. 10. By this construction, the spring members between the points of attachment are reinforced in the manner of a truss, whereby to more scientifically distribute the strains throughout in each direction from the central point between each pair of clamps. The drawing also shows the arrangement of the clamps with relation to the next innermost annular member, with which the outermost member is connected by its clamp 16', embracing the widened or reinforcing portion of the said adjacent member 8' at a point midway between the next adjacent pair of clamps 15', 15'. This construction and arrangement will be more clearly understood from an inspection of the cross sectional views, Figs. 8 and 9. The spring members may also be alternately thickened in gage between the clamping positions, for the same purpose, while maintaining a uniform width.

From the foregoing description, it will be readily seen that the entire tire or any portion of it is demountable from the wheel by removal of all or some of the clamps and that any one or more of the corrugated annular members may be removed and replaced. The assembled series of annular members forming the entire rim, with their clamp attachments, form in their entirety a yielding tread which will readily conform itself to any inequalities in the road surface, will absorb the shocks of impact, and give very easy riding qualities.

The advantages of the invention will be readily appreciated by all those familiar with the use of resilient wheels and the invention overcomes the objections and accomplishes the advantages noted in a high degree.

It will be understood that the proportions, arrangement, number of parts, etc., may be greatly changed or varied and we do not desire to be limited to the detail constructions shown and described, but to include all such changes or variations as may be made therefrom by the skilled mechanic as within the scope of the following claims:

What we claim is:—

1. A wheel having a tire portion composed of a plurality of radially spaced continuously undulating annular spring members, series of pairs of alternating connecting clamps engaging the edges of undulating portions of said spring members, and bolts extending between the spring members engaging the clamps and holding them together, and similar clamps and bolts connecting the innermost spring members to the wheel in spaced relation thereto substantially as set forth.

2. The combination with the rim of a wheel and an outer tread member radially spaced away therefrom, of an intervening series of radially spaced continuously undulating annular spring members, means for connecting the innermost spring member to the rim, and series of pairs of alternately arranged connecting clamps engaging the undulating portions of adjacent spring members by their edges, each pair of said clamps having a holding bolt extending between said spring members and securing the clamps to the spring members, substantially as set forth.

3. The combination with a wheel and an outer tread member, of a plurality of radially spaced annular spring members of non-uniform cross section, and alternating annular series of connecting devices holding said parts together, substantially as set forth.

4. In a wheel, the combination of a plurality of radially spaced undulating annular spring members having meeting terminals notched at their edges, and means for connecting the ends of one member together and said member to the next adjacent member consisting of clamps having lugs adapted to embrace the edges of said members and the notched portions of the meeting terminals respectively and a bolt connecting said clamps, substantially as set forth.

In testimony whereof we hereunto affix our signatures in the presence of two witnesses.

JOSEPH T. WEINZIERL.
JULIUS STURTEVANT.

Witnesses:
REYNOLDS LAUGHLIN,
L. T. MITCHELL.